Feb. 3, 1925.
C. J. OXFORD
1,524,749
DEVICE FOR TESTING MACHINE ABILITY OF MATERIAL
Filed April 20, 1921    3 Sheets-Sheet 1
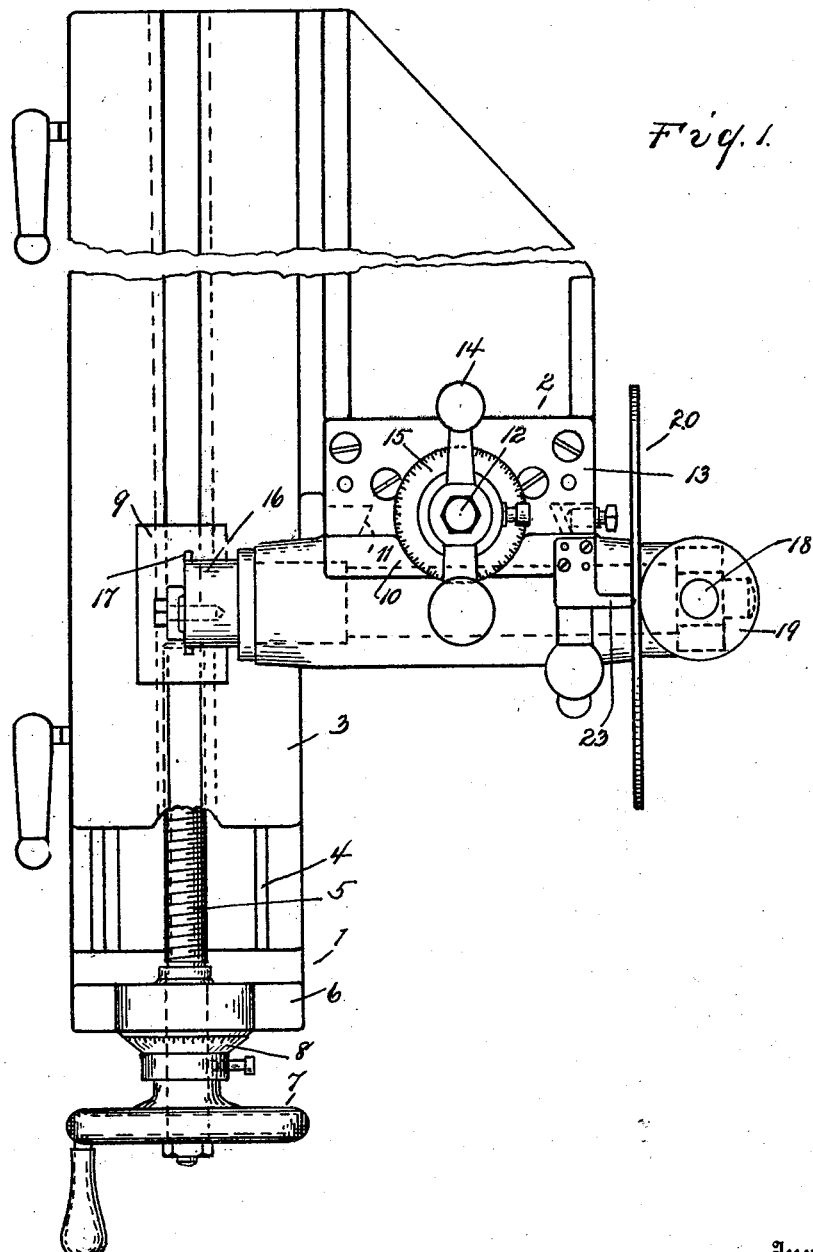

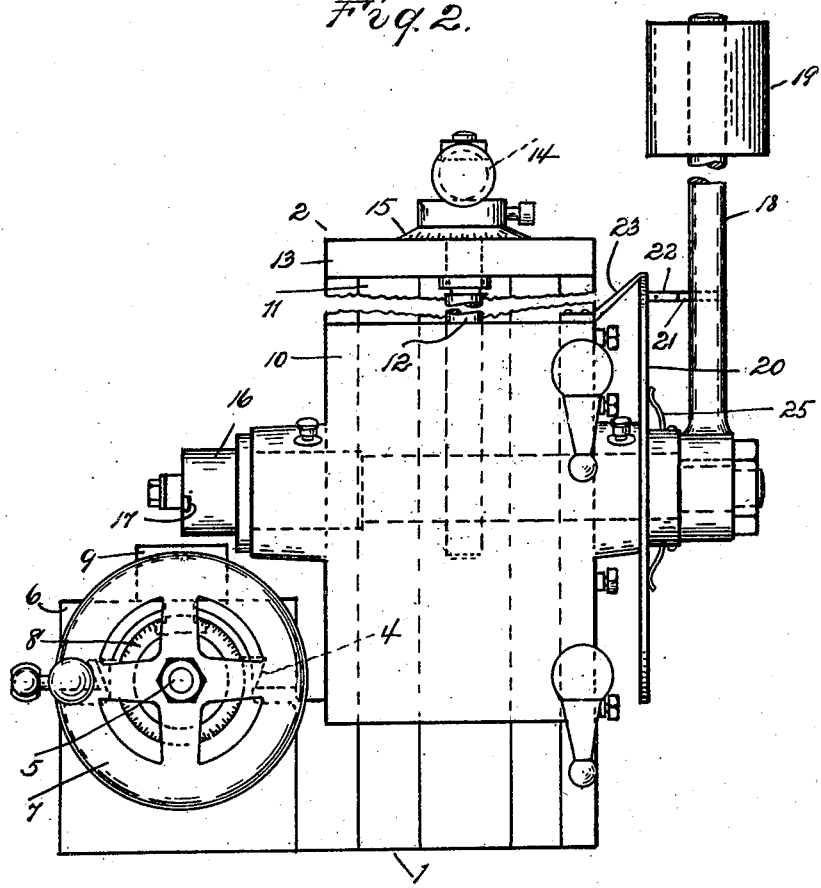

Feb. 3. 1925.                                                            1,524,749
                           C. J. OXFORD
             DEVICE FOR TESTING MACHINE ABILITY OF MATERIAL
                    Filed April 20, 1921        3 Sheets-Sheet 3
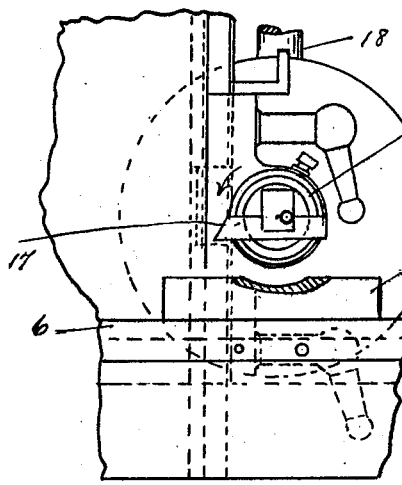
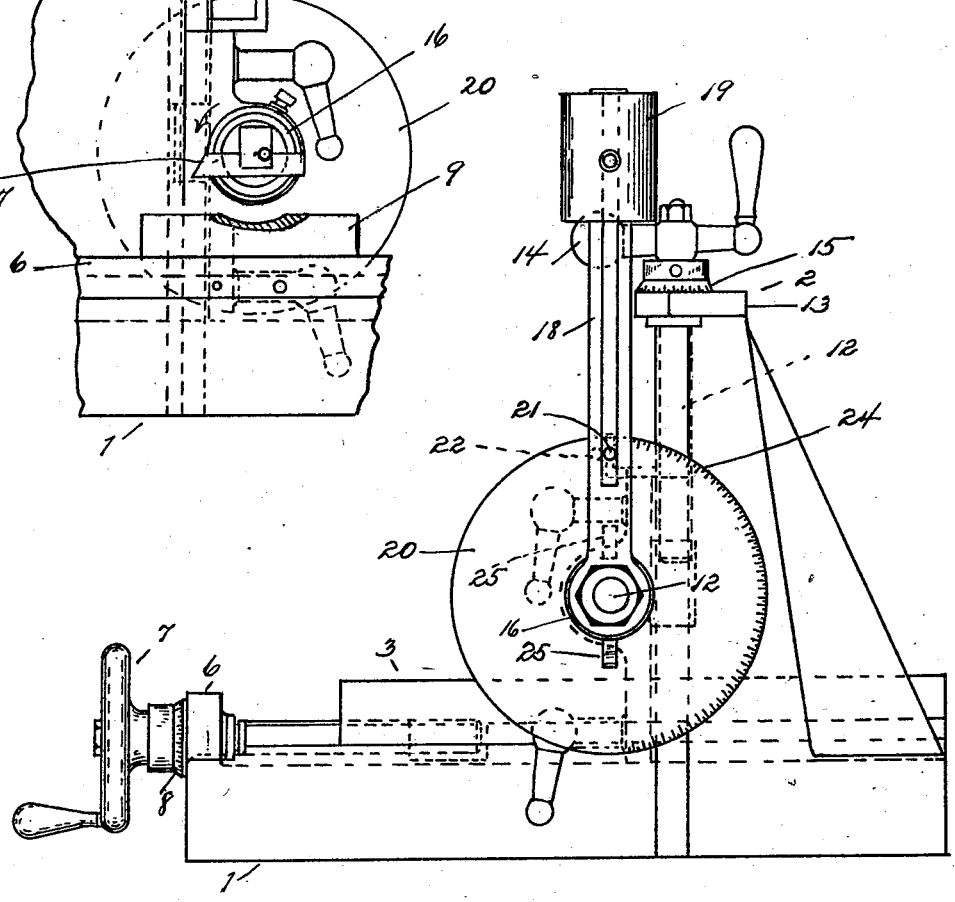
Inventor
Carl J. Oxford
By Whittemore Hulbert Whittemore
   & Belknap         Attorneys Patented Feb. 3, 1925.

1,524,749

UNITED STATES PATENT OFFICE.

CARL J. OXFORD, OF DETROIT, MICHIGAN, ASSIGNOR TO NATIONAL TWIST DRILL & TOOL CO., OF DETROIT, MICHIGAN, A CORPORATION OF MICHIGAN.

DEVICE FOR TESTING MACHINE-ABILITY OF MATERIAL.

Application filed April 20, 1921. Serial No. 462,932.

*To all whom it may concern:*

Be it known that I, CARL J. OXFORD, a citizen of the United States of America, residing at Detroit, in the county of Wayne and State of Michigan, have invented certain new and useful Improvements in Devices for Testing Machine-Ability of Material, of which the following is a specification, reference being had therein to the accompanying drawings.

The invention relates to a device for testing the machine-ability of material in which machine-ability is defined as the degree of ease with which a material can be cut in machining operations such as milling, drilling, reaming, turning, broaching, etc.

It has been recognized of late that neither chemical analysis nor physical tests hitherto available will give a dependable indication of the machine-ability of materials. With my invention, the indication of the machine-ability is dependable and furthermore is directly secured. Moreover in determining the machine-ability, the same conditions are reproduced as those encountered in actual practice. With these objects in view, my invention resides in the novel features of construction and combinations and arrangements of parts as more fully hereinafter set forth.

In the drawings:

Figure 1 is a top plan view of a device embodying my invention;

Figure 2 is an end elevation thereof;

Figures 3 and 4 are respectively front and rear elevations thereof.

In general, my invention comprises the applying of predetermined energy to a tool adapted to take a standardized cut in the material and the determining of the energy expended in making the cut.

In detail, 1 is the base and 2 the standard thereon. 3 is the table slide engaging the guide-way 4 upon the base 1 and adjustable longitudinally by means of the screw 5 extending through the upwardly extending flange 6 upon the base and rotatable by means of the hand wheel 7 keyed upon its outer end. 8 is a suitable micrometer indicator disk which is rotatable with the screw 5 for indicating very small adjustment of the table slide and the work or material 9 secured thereto. 10 is a vertical slide engaging in the slide-way 11 in the standard 2 and adjustable vertically by means of the screw 12 extending through the lateral projection 13 at the upper end of the standard 2 and rotatable by means of the ball crank handle 14. A suitable micrometer indicator disk 15 is also provided in this case which is rotatable with the screw 12 for indicating very slight vertical adjustment of the vertical slide 10. 16 is a horizontal shaft journalled in the vertical slide 10, and 17 is a tool for making a standardized cut in the work or material 9, this tool being secured to the rear end of the shaft.

For applying predetermined energy to the cutting tool 17, there is the lever 18 secured upon the front end of the shaft 16 and having the weight 19 at its outer end, this lever being adapted to swing from a position above the shaft to rotate the shaft and swing the cutting tool through an arc. To indicate the distance the weighted lever moves when the cutting tool moves freely of the work and also when the cutting tool makes a standardized cut in the work, there is the indicator disk 20 rotatably surrounding the shaft 16 in rear of the weighted lever 18. For actuating this indicator disk from the weighted lever, there are cooperating pins 21 and 22 respectively upon the weighted lever and indicator disk which overlap so that rotation of the weighted lever in one direction will rotate the indicator disk. 23 is a suitable finger upon the standard 2 and extending adjacent to the indications 24 upon the indicator disk whereby the readings may be easily taken. For yieldably retaining the indicator disk in its positions of rotative adjustment, there are the retainer springs 25 secured to the standard 2 and having their free ends in frictional engagement with the outer face of the indicator disk.

To determine the machine-ability of the work or material 9, the weighted lever 18 is permitted to swing from a position above the shaft 16 thereby rotating the indicator disk 20, shaft 16, and cutting tool 17. The advanced point reached by the cutting tool is indicated by the finger 23 cooperating with the indicator disk 20 which latter is yieldably held in its position of rotative adjustment by means of the retainer springs 25. Then the table or horizontal slide 3 and vertical slide 10 are adjusted so that the cutting tool 17 will make a standardized cut in the work 9 after which the weighted lever is permitted to swing from its original position to thereby rotate the indicator disk, the shaft and the cutting tool from their original positions. The advanced point reached by the cutting tool is again read by means of the indicator disk and cooperating finger and the difference in distance travelled under the two conditions, which is indicated by the difference between the two advanced points, represents the amount of energy expended in making the cut in the work which latter is a direct indication of the machine-ability of material in question.

What I claim as my invention is:

1. In a device for testing the machine-ability of material, the combination with a tool movable through an arc to make a cut in the material, of a weight movable through an arc and connected to said tool to actuate the same, and means for indicating the advanced points reached by said tool when moving freely of the material and when making a cut in the same.

2. In a device for testing the machine-ability of material, the combination with a shaft, of a weighted arm upon said shaft and adapted to rotate the same, a tool upon said shaft and rotatable therewith to make a cut in the material, an indicator disk rotatable with said shaft, and a finger cooperating with said indicator disk.

3. In a device for testing the machine-ability of material, the combination with a tool movable through an arc for making a cut in the material, of a weight movable through an arc for actuating said tool, a rotatable indicator disk, means for rotating said disk upon movement of said weight, and means for yieldably maintaining said disk in its position of rotative adjustment.

4. In a device for testing the machine-ability of material, the combination with a horizontal shaft, of a cutting tool upon said shaft and rotatable therewith to make a cut in the material, a weighted lever upon said shaft for rotating the same, a rotatable disk, means upon said lever and rotatable disk for rotating said disk in one direction upon rotation of said lever, and means frictionally engaging said disk to hold the same in its adjusted position.

5. In a device for testing the machine-ability of material, the combination with a base, and a standard, of a horizontal slide upon said base adapted to carry the work, a vertical slide upon said standard, a horizontal shaft journalled in said vertical slide, a tool rotatable with said shaft for making a cut in the work, a weighted lever upon said shaft for rotating the same, a rotatable indicator disk, a finger upon said standard extending adjacent to the periphery of said disk, cooperating means upon said weighted lever and disk for rotating the latter from the former in one direction of rotation, and a spring frictionally engaging said disk for retaining the latter in its adjusted position.

6. The method of testing the machine-ability of materials, comprising the steps of applying predetermined energy to a cutting tool to move the same a predetermined distance over a predetermined resistance, of bringing the material to be tested into the path of travel of the cutting tool, and of measuring the differences in movement of the tool when moving freely of the material and when making a cut in the same.

7. In a device for testing the machine-ability of material, the combination with a tool movable through an arc to make a cut in the material, of means for applying predetermined energy to the tool to move the same through an arc, and means for measuring the differences in arcs through which the tool moves freely of the material and in cutting engagement therewith.

8. In a device for testing the machine-ability of material, the combination of a tool for making a cut in the material, of means for applying predetermined energy to the tool to move the same, means for subjecting the movement of the tool to a resistance to limit its movement when moving freely of the material, and means for measuring the difference between the distance the tool moves when moving freely of the material and the distance the tool moves when making a cut in the material.

9. In a device for testing the machine-ability of material, the combination with a tool for making a cut in the material, of a weight movable through an arc for actuating said tool, means for subjecting the movement of the tool to a resistance to limit its movement when moving freely of the material, and means for measuring the difference between the distances the tool moves when moving freely of the material and when making a cut in the material.

10. In a device for testing the machine-ability of material, the combination with a tool for making a cut in the material, of means for applying predetermined energy to the tool for moving the same, the energy being sufficient to move the tool into and out of engagement with the material when the tool makes a cut in the material, means for subjecting the movement of the tool to a resistance to limit its movement when moving freely of the material, and means for measuring the difference between the distances the tool moves when moving freely of the material and when making a cut in the material.

11. In a device for testing the machine-ability of material, the combination of a tool for making a cut in the material, of means for applying predetermined energy to the tool to move the same freely of the material and also when making a cut, and means for measuring the difference between the distance the tool moves when moving freely of the material and the distance the tool moves when making a cut in the material.

12. The method of testing the machineability of materials comprising the steps of applying initial energy to a cutting tool to move the same a distance, of bringing the material to be tested into the path of the cutting tool and applying the same conditions of initial energy, and of measuring the difference in movement of the tool when moving freely of the material and when making a cut in the same.

In testimony whereof I affix my signature.

CARL J. OXFORD.